US 6,449,491 B1

(12) United States Patent
Dailey

(10) Patent No.: US 6,449,491 B1
(45) Date of Patent: Sep. 10, 2002

(54) APPARATUS AND METHODS FOR CONDUCTING GROUP CALLS IN WIRELESS COMMUNICATIONS SYSTEMS

(75) Inventor: Timothy E. Dailey, Forest, VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/309,012

(22) Filed: May 10, 1999

(51) Int. Cl.$^7$ ............................ H04B 7/00; H04Q 7/20
(52) U.S. Cl. .................. 455/518; 455/519; 455/520; 455/426; 455/447; 455/450
(58) Field of Search ........................ 455/518, 519, 455/520, 422, 445, 426, 447, 450

(56) References Cited

U.S. PATENT DOCUMENTS

| | | | |
|---|---|---|---|
| 5,150,361 A | 9/1992 | Wieczorek et al. | 370/95.1 |
| 5,168,575 A * | 12/1992 | Cizek et al. | 455/514 |
| 5,274,837 A | 12/1993 | Childress et al. | 455/7 |
| 5,299,199 A | 3/1994 | Wilson et al. | 370/95.3 |
| 5,345,474 A | 9/1994 | Hoshikawa | 375/7 |
| 5,465,391 A * | 11/1995 | Toyryla | 455/422 |
| 5,475,689 A | 12/1995 | Kay et al. | 370/95.3 |
| 5,506,837 A | 4/1996 | Söllner et al. | 370/31 |
| 5,594,948 A * | 1/1997 | Talarmo et al. | 455/518 |
| 5,613,201 A | 3/1997 | Alford et al. | 455/331 |
| 5,617,412 A | 4/1997 | Delprat et al. | 370/281 |
| 5,774,806 A | 6/1998 | Tayloe et al. | 455/427 |
| 5,797,100 A * | 8/1998 | Dettner | 455/518 |
| 5,822,694 A | 10/1998 | Coombes et al. | 455/433 |
| 5,873,023 A | 2/1999 | Phillips et al. | 455/38.1 |
| 5,930,723 A * | 7/1999 | Heiskari et al. | 455/518 |
| 5,970,417 A | 10/1999 | Toyryla et al. | 455/519 |
| 5,987,331 A | 11/1999 | Grube et al. | 455/509 |
| 5,991,635 A | 11/1999 | Dent et al. | 455/517 |
| 6,026,296 A | 2/2000 | Sanders, III et al. | 455/426 |
| 6,115,613 A | 9/2000 | Jonsson | 455/519 |
| 6,138,011 A | 10/2000 | Sanders, III et al. | 455/426 |
| 6,195,415 B1 | 2/2001 | Shimoda et al. | 379/22 |
| 6,272,334 B1 | 8/2001 | Rao | 455/418 |
| 6,292,670 B1 * | 9/2001 | Kauria et al. | 455/518 |

FOREIGN PATENT DOCUMENTS

| | | | |
|---|---|---|---|
| EP | 0 642 287 A1 | 9/1993 | H04Q/7/38 |
| EP | 0 942 616 A1 | 9/1999 | H04Q/7/38 |
| GB | 2 271 690 A | 4/1994 | |
| WO | WO 94/14289 | 6/1994 | |
| WO | WO 94/28687 | 12/1994 | |
| WO | WO 97/07604 | 2/1997 | H04B/7/26 |
| WO | WO 98/05157 A2 | 2/1998 | |
| WO | WO 98/05157 A3 | 2/1998 | H04N/9/00 |
| WO | WO 98/05176 | 2/1998 | |
| WO | WO 99/17581 | 8/1999 | |

OTHER PUBLICATIONS

TR45 TIA/EIA–136–123–A Draft Text: Digital Control Channel Layer 3: Ch.1.1.1 and 1.1.2, 5 pages (Aug. 1998).
International Search Report, PCT/US00/10299, Sep. 21, 2000.

* cited by examiner

Primary Examiner—Edward F. Urban
Assistant Examiner—Temica M. Davis
(74) Attorney, Agent, or Firm—Myers Bigel Sibley & Sajovec

(57) ABSTRACT

A group call is conducted in a wireless communications system including a plurality of distributed transceiver units, e.g., radio heads of a private wireless system, each of which are operative to communicate with terminals over a plurality of communications channels. A group call origination message is transmitted from an originating terminal, preferably in response to a user input at the originating terminal, more preferably in response to actuation of a push-to-talk (PTT) device at the originating terminal. The transmitted group call origination message is received at a transceiver unit and, in response, a group call traffic channel designation messages addressed to a group of terminals is transmitted from the transceiver units, the transmitted group call traffic channel designation message designating a common traffic channel. Communications then occur among terminals of the group of terminals, preferably in half-duplex mode, over the designated common traffic channel.

71 Claims, 9 Drawing Sheets

APPARATUS AND METHODS FOR CONDUCTING GROUP CALLS IN WIRELESS COMMUNICATIONS SYSTEMS

RELATED APPLICATIONS

This application is related to: application Ser. No. 09/309,005 entitled Methods and Systems for Providing Group Calls with Reduced Setup Times; application Ser. No. 09/309,018 entitled Methods And Systems For Providing Temporary Identification Numbers For Mobile Terminals; application Ser. No. 09/307,996 entitled Methods, Systems, and Terminals for Assigning Control Channel Time Slots for Group and Individual Pages; and application Ser. No. 09/309,022 entitled Methods, Systems, and Terminals for Providing Group Communications Over a Common Traffic Channel. Each of these applications are being filed concurrently with the present application, each of these applications have common inventorship, and each of these applications are assigned to Ericsson Inc. In addition, the disclosures of each of these applications are hereby incorporated herein by reference.

FIELD OF THE INVENTION

The present invention relates to wireless communications systems (apparatus) and methods, and more particularly, to systems and methods for communicating among terminals in wireless communication systems.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have been long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Corpses Telephone) and data communications services such as CDPD (Cellular Digital Packet Data). These and other systems are described in The Mobile Communications Handbook, edited by Gibson and published by CRC Press (1996).

Included among the wireless communications systems in use today are low-power private wireless systems that are used to cover a limited geographic area, such as office, a building or a campus. An example of such a private wireless system is the Digital Wireless Office System (DWOS) developed by Ericsson Inc., the assignee of the present invention. As illustrated in FIG. 1, the DWOS 110 is designed for use by wireless terminals 150 that are also configured to access a public cellular network 130, such as a cellular network complying with IS-41, IS-136 or other standards. The DWOS 110 includes a plurality of radio heads 118, i.e., transceiver units that function in a manner similar to base stations of the public cellular network 130. The radio heads 118 are networked with a private cellular radio exchange (CRE) 114 that handles air interface and switching functions, and a mobility server 116 that provides such functions as home location registration, authentication, interfacing the DWOS to the public cellular network 130, as well as other operation and maintenance functions. The DWOS 110 also includes one or more scanning heads 119, receiver units that monitor the radio frequency (RF) environment and determine which frequencies the DWOS 110 can use with the least interference. The DWOS 110 also includes a public exchange (PBX) that connects the radio infrastructure to regular wireline telephones 111 and to the public switched telephone network (PSTN) 120.

The Ericsson DWOS system described is specifically designed to operate according to an IS-136 time division multiple access (TDMA) air interface. An IS-136 TDMA system is implemented by communicating over a plurality of carrier frequency bands during repeating series of time slots, with each repeating series of time slots constituting a "physical channel." "Logical channels" are mapped onto the physical channels by assigning selected slots of a physical channel to selected channels in repeating frame, superframe and hyperframe structures, in a manner well known to those skilled in the art.

Typically included among the channels are dedicated control channels, including forward (downlink) control channels for conveying information from base stations (or radio heads, in the DWOS) to terminals, and reverse control channels for conveying information from terminals to base stations. The information broadcast on a forward control channel may include such things as an identification of a geographic cell served by a transmitting base station, and associated network identification, system timing and other information needed to access the wireless system. Reverse control channels are typically used for transmitting access requests and page acknowledgments from terminals.

An exemplary slot allocation utilized by wireless systems complying with the IS-136 standard is illustrated in FIG. 2. For groups of three repeating slots on the uplink and downlink carrier frequency bands used by a base station, a "slot pair" on one pair of carrier frequency bands is reserved for the provision of a forward (downlink) Digital Control Channel (FDCCH) and a reverse (uplink) DCCH (RDCCH). Other slot pairs may be assigned to Digital Traffic Channels (DTCs), i.e., channels assigned to particular terminals on a dynamic basis for communication of voice or other data.

As illustrated in FIG. 3, an IS-136 FDCCH has a plurality of logical channels mapped thereon, including a multiplexed Broadcast Channel (BCCH) designed to convey information about system configuration and system access rules, and a multiplexed point-to-point short message service (SMS), paging and access response channel (SPACH). The BCCH is further divided into a Fast Broadcast Channel (F-BCCH) for conveying time-critical information such as system identification (ID) and registration information, an Extended Broadcast Channel (E-BCCH) for conveying less time critical information such as neighboring cell lists, and an SMS Broadcast Channel (S-BCCH). The SPACH comprises a short message service channel (SMSCH) for carrying messages, a paging channel (PCH) for conveying system pages, and an access response channel (ARCH) for providing system response to queries from subscriber units and other administration information. A Shared Channel Feedback (SCF) field contains information about the reservation status of an associated Random Access Channel (RACH) on the RDCCH. The RACH is used by terminals to transmit requests to access the wireless system.

A call between terminals 150 in a standard wireless system such as the DWOS 110 of FIG. 1 is typically initiated by one of the terminals 150 transmitting a call origination message that identifies the number the originating terminal desires to call. This origination message is received by one of the radio heads 118, and conveyed to other elements of the DWOS for authorization and traffic channel designation. Once the call request is authorized, the system transmits a traffic channel designation message to the originating terminal, designating a traffic channel for use by that terminal. The DWOS 110 also transmits a page message addressed to the called terminal from selected radio heads 118, typically based on location information maintained by the mobility server 116. The called terminal acknowledges the page by transmitting a page acknowledgment message, which typically is received by more than one of the radio heads. Typically based on relative signal strengths of the acknowledgments received at the radio heads, one of the radio heads is selected to communicate with the called terminal, and an appropriate traffic channel designation message is transmitted to the called terminal, designating a traffic channel for its use.

Communications between the terminals are then conducted over the designated traffic channels. During the call, both voice and control information may be communicated over the designated channels using so-called "in-band" signaling channels mapped onto the designated traffic channels. Signals communicated over the designated traffic channels are also typically monitored for signal quality. This in-band signaling and monitoring is typically used to guide handoffs as terminals 150 move among areas served by different radio heads 118.

This call setup procedure may also be used to setup a group call among more than two terminals. However, the above-described call setup procedure may be too cumbersome for some group call applications, such as emergency police or other safety applications, due to the overhead associated with paging multiple terminals.

SUMMARY OF THE INVENTION

In light of the foregoing, it is an object of the present invention to provide efficient apparatus and methods for group calling.

It is another object of the present invention to provide apparatus and methods for group calling in a private wireless system.

These and other objects, features and advantages are provided according to the present invention by wireless communications apparatus and methods in which a group call among terminals is conducted, preferably in a half-duplex manner, over a common traffic channel. For example, in a private wireless system comprising a plurality of synchronized distributed transceiver units or radio heads, voice data can be communicated to terminals over a common physical channel, i.e., frequency/time slot.

A user at an originating terminal of a predefined group may initiate a group call to other terminals in the group by transmitting a group call origination message, preferably one having a special abbreviated format, on a reverse control channel. The call origination message may be transmitted, for example, in response to actuation of a push-to-talk (PTT) device on the originating terminal. The system may respond to the group call origination message by transmitting a group call traffic channel designation message, also preferably having an abbreviated format, to the other terminals in the group over a forward control channel, without paging the other terminals in the group. In response to receipt of the traffic channel designation messages, the terminals may tune to the designated traffic channel and await an in-band confirm message that indicates which of the terminals has been designated to speak on the common channel. When the user at the designated terminal releases the traffic channel, e.g., by releasing the PTT button on the terminal, a user at another terminal in the group can gain control of the common channel by, for example, depressing the PTT button at that terminal and causing a new group call origination message to be transmitted from the terminal.

According to a "transmission trunking" aspect of the present invention, a terminal in control of the common traffic channel indicates relinquishment of the common channel by transmitting a release message that is communicated over the common channel to the other terminals of the group. When a terminal of the group receives a release message over the common traffic channel, it preferably jumps back to the control channel and actively monitors (e.g., on a slot-by-slot basis) the control channel for new group traffic channel designation messages, thus freeing the common traffic channel for other users. If a terminal in the group receives a new group call traffic channel designation message within a predetermined "hang time" following the release message, it tunes to the common traffic channel designated in the new designation message and the group call continues over the newly designated common traffic channel. If a terminal in the group fails to receive a new group call traffic channel designation message within the hang time, however, the terminal can assume that the group call has terminated and can transition to a power-saving sleep mode.

Other aspects of the present invention can further increase group call setup efficiency. A special group call "paging" subchannel may be defined that includes slots that repeat multiple times in a "normal" control channel superframe, thus providing a subframe structure within the superframe. The increase frequency of the slots of such a group call paging channel in comparison to normal paging channels can allow group-call enabled terminals to more quickly receive traffic channel designation messages, and can thus reduce group call setup times. Even greater efficiency can be gained by using a compressed addressing scheme that allows a group call origination or a group call traffic channel designation message to be transmitted in a single slot, while maintaining compatibility with terminals that are not group call enabled.

The present invention can provide ways to quickly and efficiently establish and conduct group calls. By using half-duplex communications over a common traffic channel, the overhead associated with normal call setup and control procedures can be avoided. For example, pages and page acknowledgments need not be transmitted to establish a group call, and handoffs need not occur as a terminal moves across a coverage boundary during a call. Addition efficiency may be gained using the special group call paging channels and compressed message formats. In some system, e.g., in private systems in which security is less important, additional economy can be gained by setting up group calls without authentication procedures that are typically used for "regular" calls.

In particular, according to the present invention, a group call is conducted in a wireless communications system including a plurality of distributed transceiver units, e.g., radio heads of a private wireless system, each of which are operative to communicate with terminals over a plurality of communications channels. A group call origination message is transmitted from an originating terminal, preferably in response to a user input at the originating terminal, more preferably in response to actuation of a push-to-talk (PTT) device at the originating terminal. The transmitted group call origination message is received at a transceiver unit and, in response, a group call traffic channel designation message addressed to a group of terminals is transmitted from the transceiver units, the transmitted group call traffic channel designation message designating a common traffic channel. Communications then occur among terminals of the group of terminals, preferably in half-duplex mode, over the designated common traffic channel.

According to an aspect of the present invention, a group call traffic channel designation message is transmitted over a control channel which terminals of the group actively monitor when no data is being transferred over the common traffic channel. Data is transmitted from one of the group of terminals over the common traffic channel and received at a transceiver unit. The received data is then transmitted from the plurality of transceiver units over the common traffic channel. Transmission of the received data may then be followed by transmission of a release message from the plurality of transceiver units over the common traffic channel. In response to receipt of the release message, the terminals monitor the control channel for a new group call traffic channel designation message, thus freeing the common traffic channel for other use.

According to another aspect of the present invention, slots assigned to control channels make up a hyperframe comprising a plurality of superframes. Group call enabled terminals monitor a set of periodically occurring slots in a plurality of subframes within a superframe at a terminal, e.g., slots assigned to a special group call paging subchannel of the control channel, such that these terminals can receive traffic channel designation messages in a more timely fashion than ordinary pages.

According to another aspect of the present invention, a group call confirm message is transmitted over the common traffic channel prior to transmission of data received from one of the terminals of the group. The confirm message identifies the originating terminal, thus allowing the terminals to determine which terminal should transmit over the common traffic channel.

According to still another aspect of the present invention, the control channel comprises a series of slots on a carrier frequency band, and a group call traffic channel designation message is transmitted in a single slot assigned to the control channel. The group call traffic channel designation message may be addressed based on a Temporary Mobile System Identification (TMSI) assigned to a terminal by the wireless communications system in order to fit the message into a single slot. Preferably, a least signficant portion of a TMSI field is used to allow group-call enabled terminals to send and receive group call control information in a manner which is compatible with addressing of non-group call enabled terminals.

According to yet another aspect of the present invention, a terminal transitions from active monitoring of the control channel to a sleep mode if a predetermined time interval following receipt of a release message elapses without receipt of a new group call traffic channel designation message on the control channel. The predetermined interval may be indicated in a release message received over the common traffic channel. If a new group call traffic channel designation message designating the same or a new common traffic channel is received at the terminals of the group before lapse of the predetermined interval, however, the group call may resume on the second designated traffic channel. The new group call traffic channel designation message may be transmitted in response to a call origination message transmitted by a terminal of the group, e.g., in response to a user at one of the terminals depressing a PTT button to take control of the group call.

In another embodiment according to the present invention, a wireless communications system comprises means for receiving a group call origination message from an originating terminal. Means are provided, responsive to the means for receiving a group call origination message, for transmitting a group call traffic channel designation message addressed to a group of terminals in response to receipt of the group call origination message, the transmitted group call traffic channel designation message designating a common traffic channel. Means are also provided, responsive to the common traffic channel, for communicating among terminals of the group of terminals over the designated common traffic channel. The means for receiving a group call origination message, the means for transmitting a group call traffic channel designation message and the means for communicating among terminals preferably comprise a plurality of distributed transceiver units, a cellular radio exchange connected to each of the plurality of distributed transceiver units, and a mobility server connected to the cellular radio exchange.

In another embodiment according to the present invention, a terminal for use in wireless communications systems includes means for receiving a group call traffic channel designation message addressed to the terminal, the received group call traffic channel designation message designating a common traffic channel; and means, responsive to the means for receiving, for communicating with a plurality of other terminals over the designated common traffic channel. The terminal may further comprise means for transmitting a group call origination message responsive to a user input.

Improved methods, systems and terminals for conducting wireless group calls may thereby be provided.

DETAILED DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
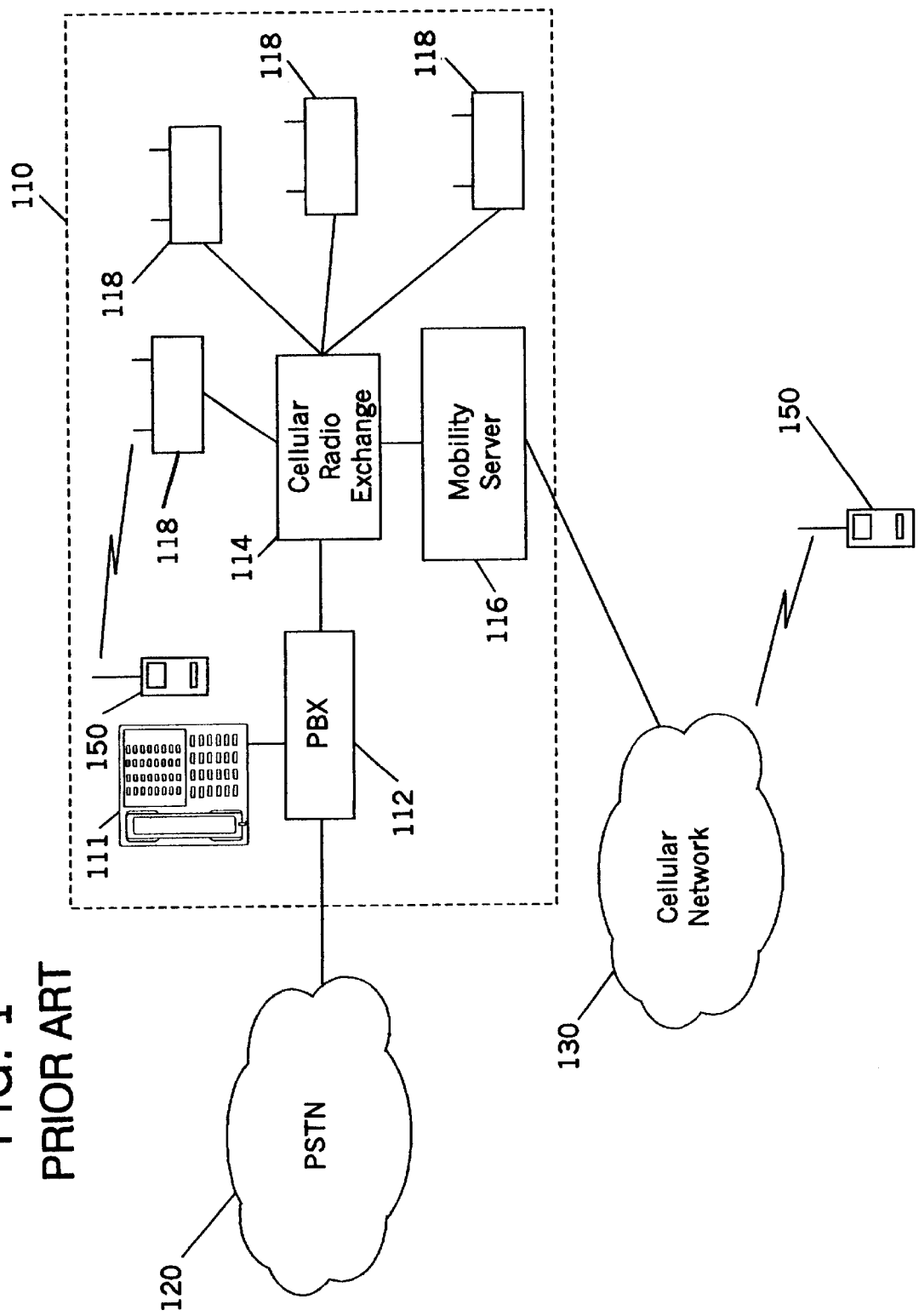
FIG. 1 illustrates a private wireless communications system according to the prior art.
Figure 2:
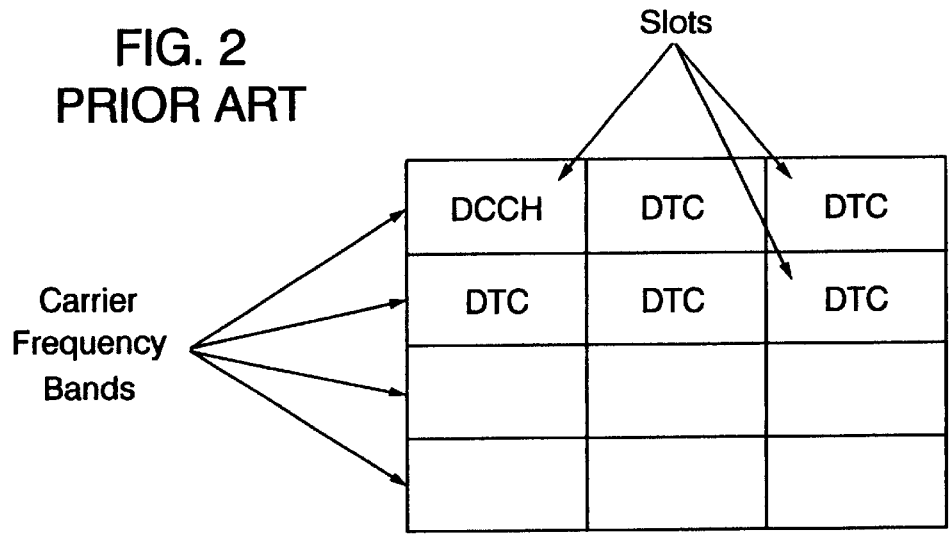
FIG. 2 illustrates physical channel assignment for a time division multiple access (TDMA) wireless communications system according to the prior art.
Figure 3:
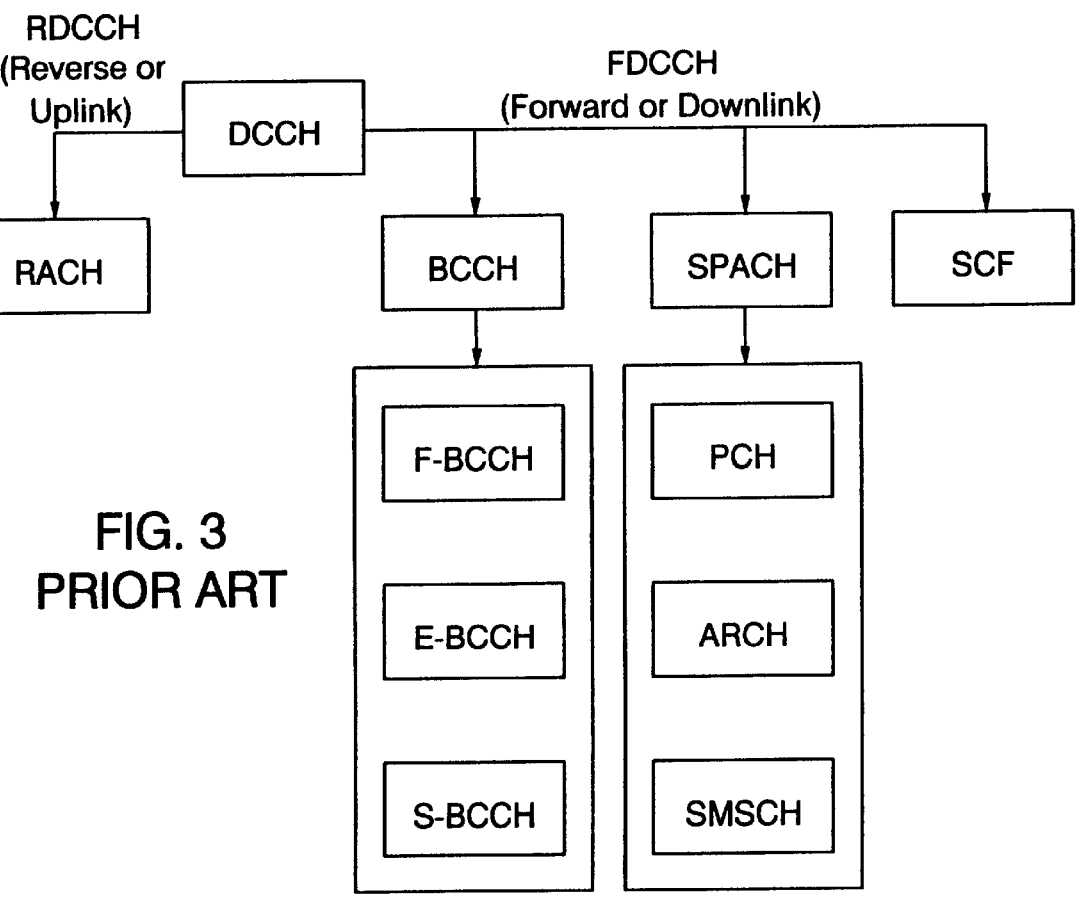
FIG. 3 illustrates logical control channel assignments for a wireless communications system according to the prior art.
Figure 4:
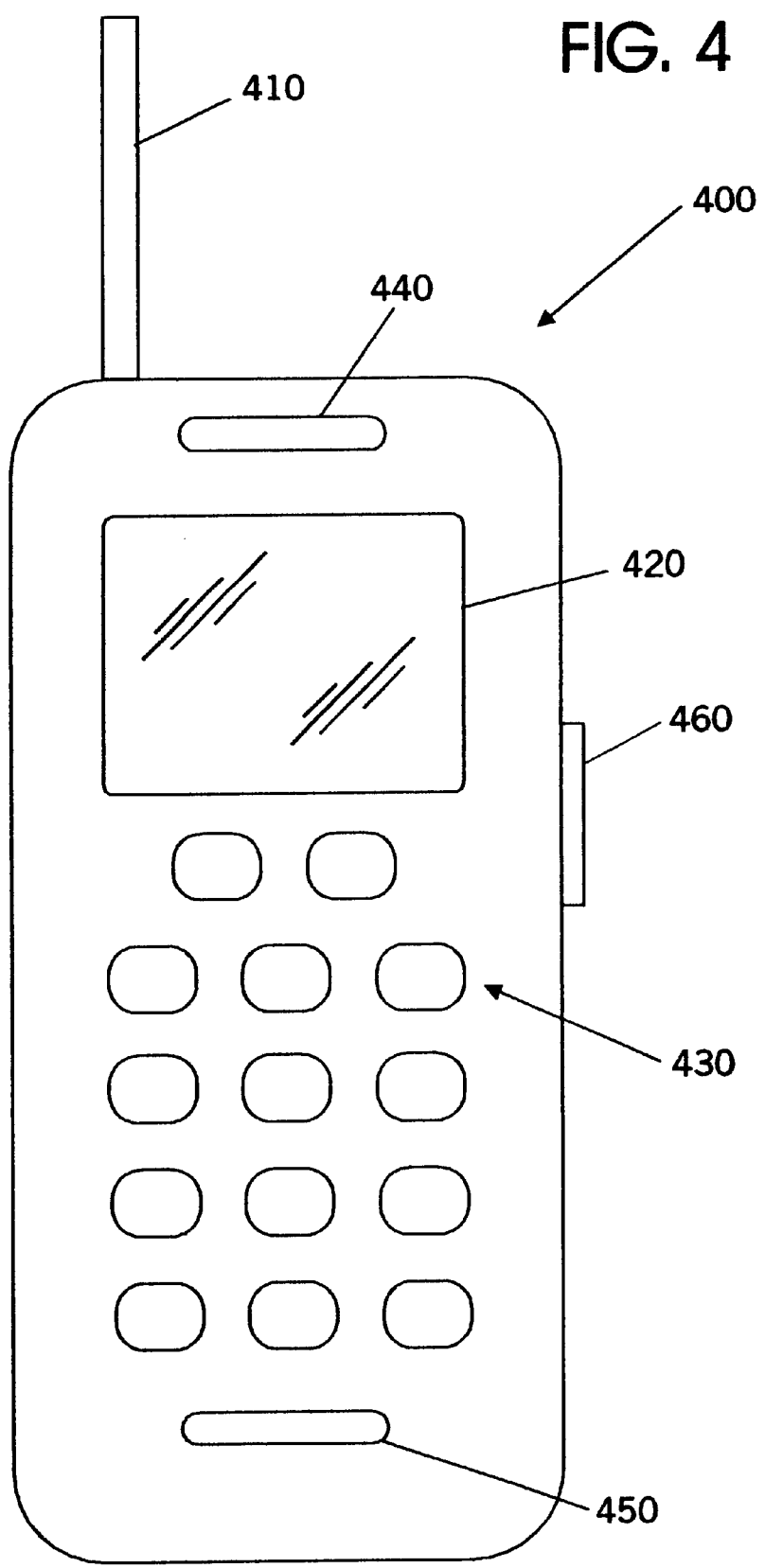
FIGS. 4–5 illustrate a wireless terminal in which group calling methods and apparatus may be embodied according to the present invention.
Figure 5:
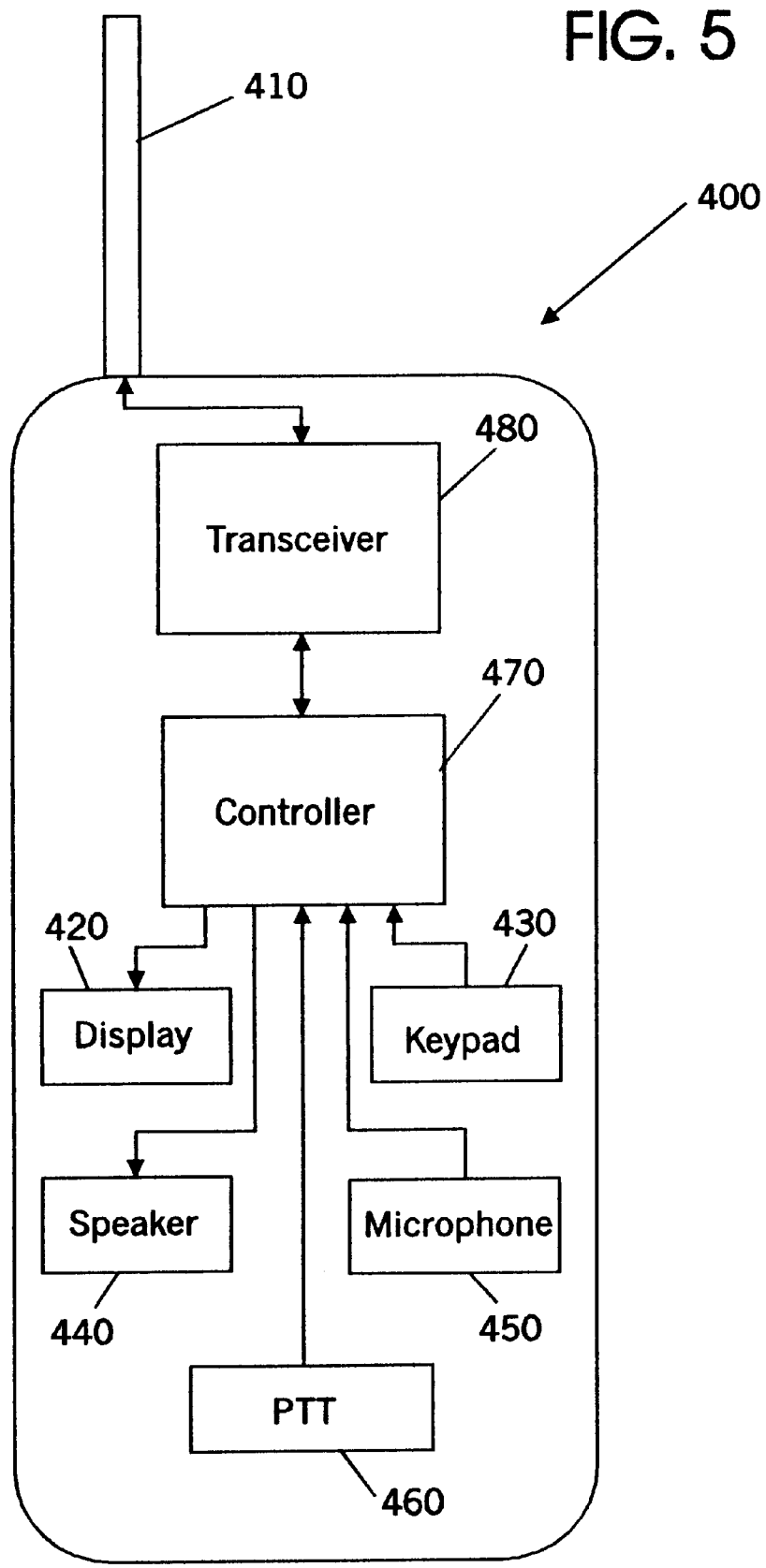

FIG. 4 illustrates a wireless terminal 400 in which apparatus and methods according to the present invention may be embodied. The terminal 400 includes an antenna 410 for receiving radio frequency (RF) signals. The terminal 400 provides a user interface including a display 420 for displaying information such as dialed numbers, short messages, directory listings and the like, and a keypad 430 for entering dialed numbers and accepting other user inputs for controlling the terminal 400. The user interface also includes a speaker 440 for producing audio signals and a microphone 450 for receiving voice information from a user. As shown in FIG. 5, the terminal 400 also includes a controller 470 that controls and/or monitors the display 420, the keypad 430, the speaker 440, the microphone 450 and a radio transceiver 480 tied to the antenna 410. The controller 470 may comprise, for example, a microprocessor, microcontroller or other data processing device that is operative to load and execute computer instructions for performing the group call functions described herein.

The terminal 400 also includes a push-to-talk (PTT) button 460, operatively associated with the controller 470 and used to initiate and conduct group calls as described herein. Those skilled in the art will appreciate that the PTT button 460 is a feature commonly provided on so-called "land mobile radio" terminals that are typically used by police, fire, security and similar personnel who desire the ability to communicate with predetermined groups of terminals in a dispatch mode, e.g., with other police officers or firemen, without having to enter a telephone number at the keypad 430. According to an aspect of the present invention, receipt of a user input at the PTT device 460 initiates a sequence of operations in which a call to a predetermined group of terminals is set up, all of which may occur without input at the keypad 430. According to other aspects of the present invention, the PTT device 460 controls half-duplex communications among terminals in a group call.

Figure 6:
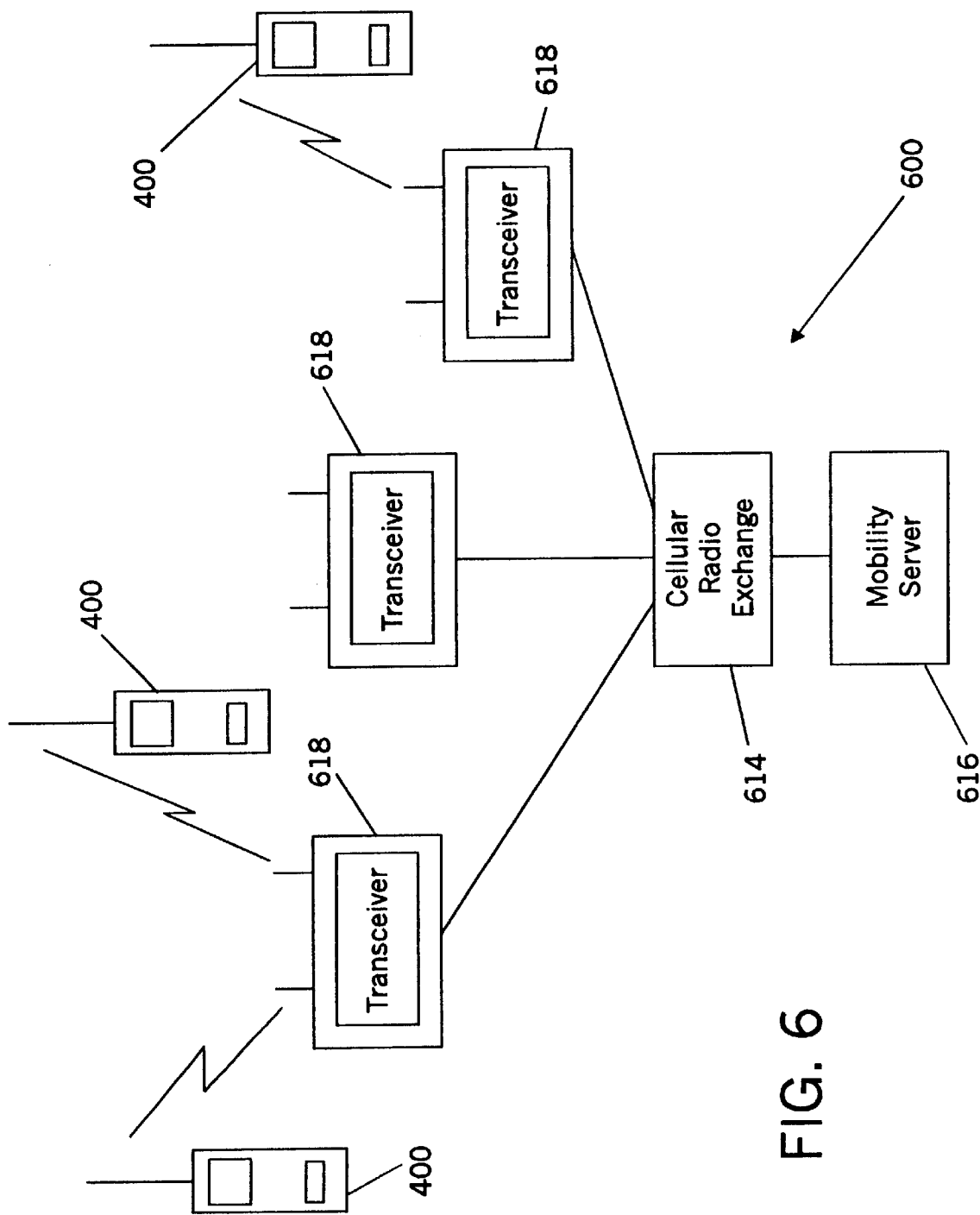
FIG. 6 illustrates a private wireless system in which group calling methods and apparatus may be embodied according to the present invention.

FIG. 6 illustrates an exemplary DWOS system 600 in which methods and apparatus of the present invention may be embodied. The DWOS system includes a plurality of distributed transceiver units 618, e.g., radio heads, that are networked with a cellular radio exchange (CRE) 614 and a mobility server 616. The transceiver units 618, in conjunction with the CRE 614 and the mobility server 616 are operative to communicate with wireless terminals 400 located throughout the coverage area served by the system 600 and, in particular, are operative to establish, conduct and terminate group calls among the terminals 400 as described in detail below.

The DWOS 110 described herein provides a system operator with the capability to operate an IS-136 "cell" to cover premises, such as a building or campus. Standard IS-136 terminals can access this private cell, making calls without using the public cellular network. The DWOS 110 typically provides coverage with a number of very low power radio heads (transceiver units). Each radio head typically supports a number of carrier frequency bands, which are divided into TDMA time slots to produce physical channels. One of the physical channels typically is dedicated to a Digital Control Channel (DCCH), which typically is broadcast by all of the radio heads all of the time. The radio heads are typically synchronized such that DCCH signals broadcast by one radio head do not unduly interfere with DCCH signals transmitted by other radio heads. The ultimate effect of this DCCH synchronization is to present a "single" DCCH to terminals roaming about the area covered by the radio heads, such that the system appears to the terminals as a single IS-136 cell.

Figure 7:
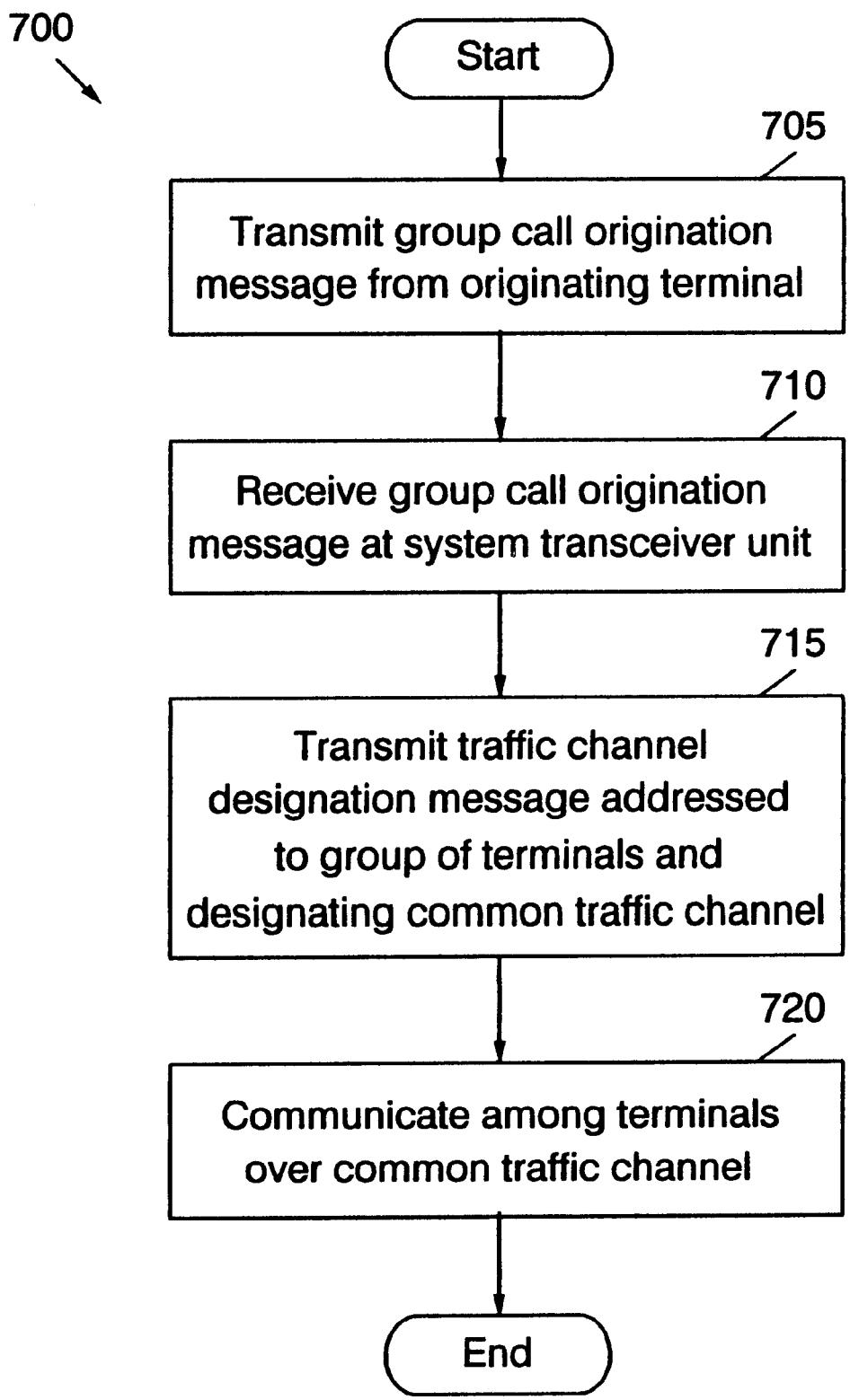
FIG. 7 illustrates exemplary group calling operations according to an aspect of the present invention.
Figure 8:
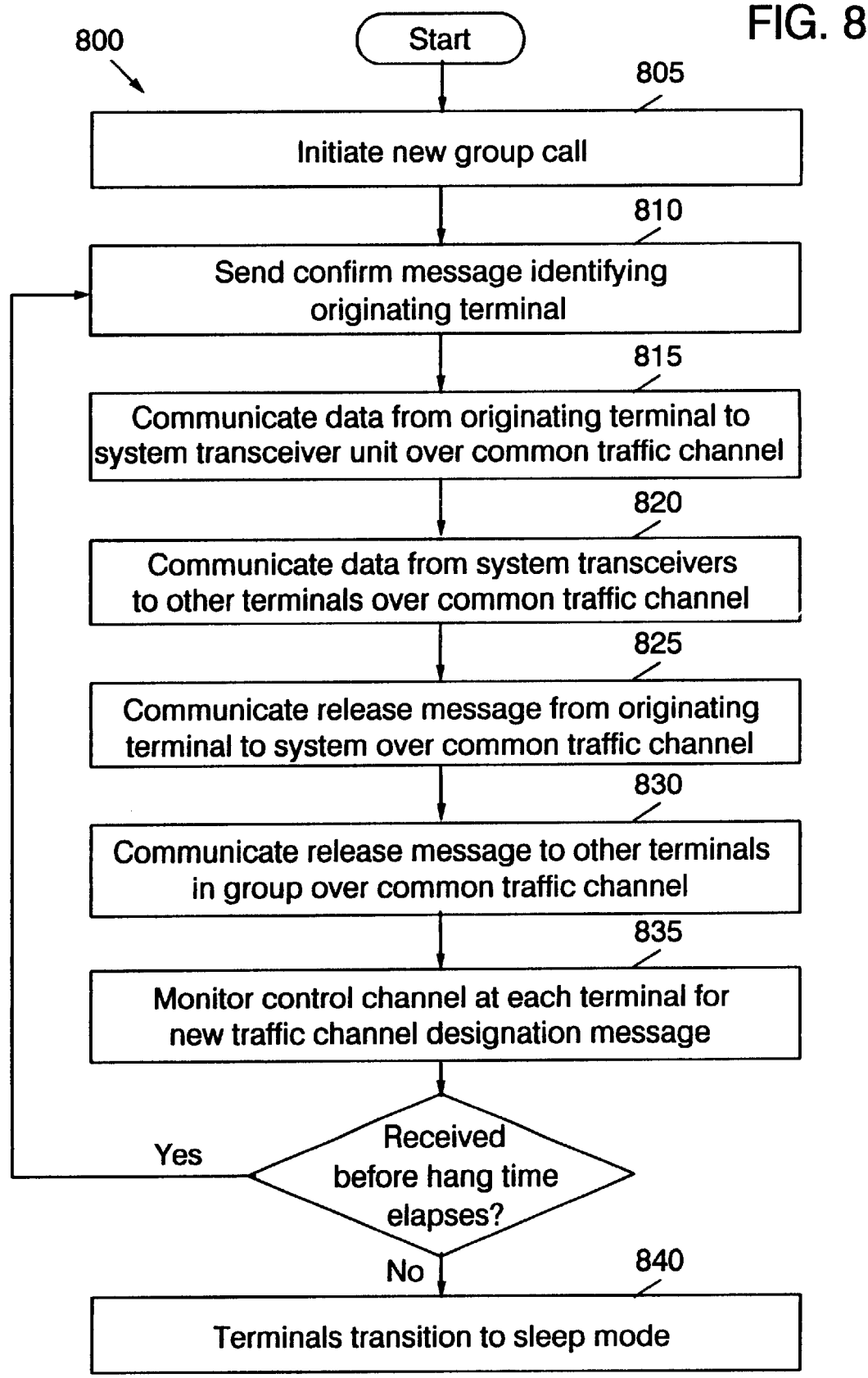
FIG. 8 illustrates exemplary group calling operations according to another aspect of the present invention.

FIGS. 7 and 8 are flowchart illustrations illustrating exemplary operations for establishing, conducting and terminating a group call according to aspects of the present invention. It will be understood that blocks of the flowchart illustrations of FIGS. 7 and 8, and combinations of blocks in the flowchart illustrations, can be implemented by computer program instructions which may be loaded onto a computer or other programmable data processing apparatus, such as the controller 470 of the terminal 400 of FIGS. 4 and 5 and the CRE 614 and mobility server 616 of the DWOS 600 of FIG. 6, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 7 and 8 support combinations of means for performing the specified functions and combinations of steps for performing the specified functions. It will also be understood that each block of the flowchart illustrations of FIGS. 7 and 8, and combinations of blocks therein, can be implemented by special purpose hardware-based computer systems which perform the specified functions or steps, or combinations of special purpose hardware and computer instructions.

FIG. 7 illustrates exemplary operations 700 for conducting a group call in a wireless system such as the system 600 of FIG. 6 using wireless terminals such as the terminal 400 of FIGS. 4–5. A group call origination message is transmitted from an originating terminal (Block 705). The transmitted group call origination message is received at one of the system transceiver units (Block 705). In response, the system transmits a traffic channel designation message addressed to terminals in the group associated with the group call origination message, identifying a common traffic channel over which the group call is to be conducted (Block 715). Communications are then conducted among the group of terminals over the designated common traffic channel (Block 720).

The present invention arises from the realization that, for group calls in a system such as the DWOS system described above, it is desirable to use a single transmit/receive frequency pair (traffic channel) for all terminals of a group, rather than a separate pair for each terminal of the group, resulting in the use of fewer channels for the group call. Preferably, the communications among the group of terminals are conducted in a half-duplex mode, i.e., one terminal talks while the others listen. However, in order to provide handoffs as terminals move from an area served by one radio head to another area served by another radio head, information typically must be transmitted over the traffic channel by the terminal. Since most terminals of the group are not transmitting at any given time during a half-duplex group call, information needed for handoffs for these terminals typically cannot be transmitted by these terminals.

According to an aspect of the present invention, the inability to perform handoffs is addressed by conducting the group call over a common traffic channel, preferably from all of the transceiver units of the system. Because the group call is transmitted over a common traffic channel in several cells, a terminal can move from a cell served by one transceiver unit to another cell served by another transceiver unit without losing the group call and without requiring a handoff. Preferably, the transceiver units of the system are sufficiently synchronized to prevent undue interference among the transceiver units.

Because a group call is broadcast in several cells simultaneously on a common channel, there is no requirement that the system page the terminals of the group. This can reduce the overhead involved in setting up a group call, as a group call can be setup by simply receiving a predetermined type of call origination message from a terminal of a group, and responsively transmitting a group call traffic channel designation message to the other terminals of the group. In the DWOS 110 described above, this can be achieved by transmitting the group call traffic channel designation message over a paging subchannel mapped onto the common control channel (DCCH) that is broadcast by each radio head 118 of the system 110. Terminals receiving a group call traffic channel designation message can them simply tune to the traffic channel designated in the message, e.g., to the frequency/slot identified in the message, and await reception of voice data over the common traffic channel. Preferably, no ring will occur at these terminals; they simply will unmute their speakers and begin generating audio signals upon receipt of voice data over the common traffic channel. Preferably, the terminals incorporate a speaker and amplifier sufficient to allow the user to hear commencement of the group call while the terminal is located in a position away from the user's ear, such as on the user's belt.

Because the group call is preferably broadcast by all the transceivers of the system, the common traffic channel preferably is allocated in a manner that minimizes idle time on the traffic channel. According to another aspect of the present invention, a "transmission trunking" technique is used to reduce system loading during a group call by releasing the common traffic channel when none of the terminals of the group is talking. FIG. 8 illustrates exemplary operations 800 for conducting a group call according to this transmission trunking aspect. A group call is originated using, for example, the operations of FIG. 7 (Block 805). After designation of the common traffic channel, a confirm message is transmitted to the terminals of the group over the designated common traffic channel (Block 810).

An exemplary format for the confirm message is given in Table I:

TABLE 1

| Information Element | Type | Length (bits) |
| --- | --- | --- |
| Protocol Discriminator | M | 2 |
| Message Type | M | 8 |
| BSMC | M | 8 |
| Caller | M | 14 |

Confirm messages preferably are Fast Associated Control Channel (FACCH) messages that are repeatedly transmitted by the transceiver units of the system over the common traffic channel until the originating terminal begins to transmit voice or other data over the common traffic channel. The Base Station Manufacturer's Code (BSMC) is used to create a new message type that is compatible with IS-136. Confirm messages also preferably include the 14-bit identification of the originating terminal taken from the group call origination message transmitted by the originating terminal. This addressing technique is described in greater detail below with respect to compressed message formats for the group call origination and the group call traffic channel designation message.

A confirm message identifies the originating terminal, i.e., the terminal that transmitted the group call origination message accepted by the system, so that any other terminals who may have transmitted a group call origination message around the same time that the originating terminal's message was received can be informed that they did not "win" the traffic channel. For example, a terminal receiving a confirm message identifying itself as the originating terminal may receive an audible beep or similar indication that the terminal can proceed to transmit voice information over the common traffic channel. Conversely, terminals receiving a confirm message identifying another terminal as the originating terminal may receive no indication.

After receiving a confirm message that identified itself, the originating terminal can proceed to communicate data, e.g., voice data, to a system transceiver unit over the common traffic channel (Block 815). For example, this may be accomplished by the originating user continuing to actuate the PTT button on the originating terminal and talking into the microphone of the originating terminal, causing the originating terminal to generate voice data and transmit the generated voice data to a system transceiver unit over the common traffic channel. The voice data is then communicated from the transceiver units of the system to the other terminals of the group on the common traffic channel (Block 820). If the user at the originating terminal finishes talking and indicates relinquishment of the common channel by, for example, releasing the PTT button on the terminal, a release message is be generated by the originating terminal and communicated through the system to the other terminals of the group over the common traffic channel (Block 825). Upon receipt of a release message, each of the terminals transitions to monitoring the control channel to await a new traffic channel designation message (Block 830).

An exemplary format for the release message is provided in Table II:

TABLE 1

| Information Element | Type | Length (bits) |
| --- | --- | --- |
| Protocol Discriminator | M | 2 |
| Message Type | M | 8 |
| BSMC | M | 8 |
| Hang time in seconds | M | 6 |

As with confirm messages, release messages preferably are Fast Associated Control Channel (FACCH) messages, and preferably use the Base Station Manufacturer's Code (BSMC) to create a new message type that is compatible with IS-136.

Preferably, a terminals engaged in a group call monitors the control channel in an "awake" mode for a predetermined "hang time" after receiving a release message, preferably at a higher rate than the terminal normally would monitor the control channel in its sleep mode, wherein it may only monitor a selected assigned paging channel or set of paging channels in order to conserve energy. For example, a terminal in sleep mode may monitor an assigned paging subchannel, such as the group call paging subchannel described in detail below, and may monitor each paging subchannel mapped onto the control channel, or some subset thereof. Accordingly, terminals in the awake mode can more quickly receive and respond to group call traffic channel designation messages to resume a group call. The hang time for the awake mode may, for example, be preprogrammed in the terminals or communicated to the terminals in release messages or other control messages.

A new traffic channel designation message may be transmitted over the control channel in response to transmission of a group call origination message transmitted by one of the group terminals in response to a user pressing its PTT button. If a new group call origination message is transmitted by one of the terminals and causes generation of a new group call traffic channel designation message on the control channel that is received before the hang time elapses, the group call resumes with the transmission of confirmation messages over the common traffic channel designated in the newly generated traffic channel designation messages (Block 810). The new group call traffic channel designation message can identify a new traffic channel (e.g., a new frequency/time slot), or may redesignate the previously designated traffic channel. If no new traffic channel designation messages are received within the hang time, the terminals assume that the group call has terminated and transition to back to a power-saving standby mode (Block 835).

Figure 9:
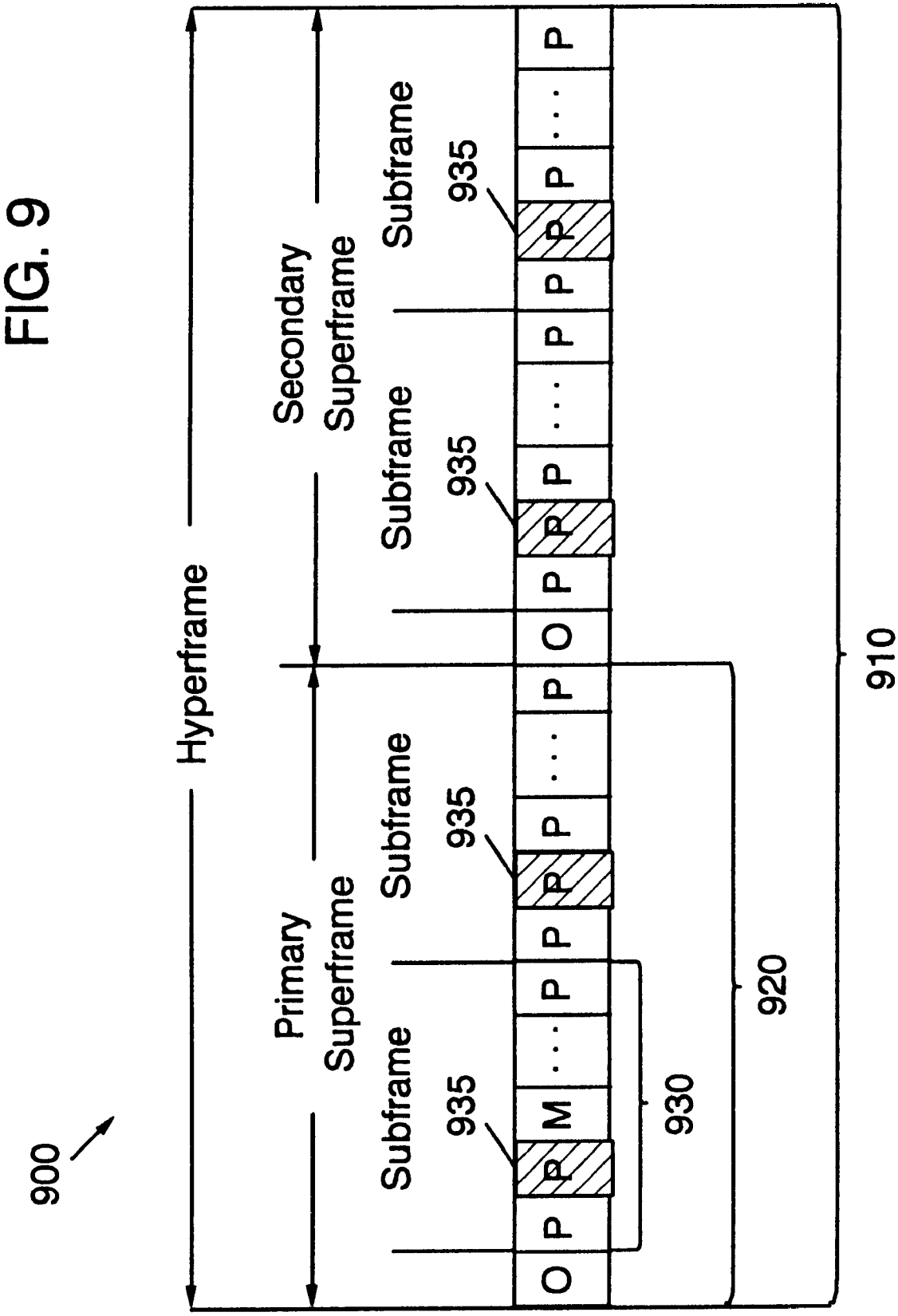
FIG. 9 illustrates exemplary call origination and traffic channel designation message formats according to an aspect of the present invention.

According to another aspect of the invention, group call set up times can be further reduced (in comparison to normal call setup procedures) by utilizing special group call paging subchannels that include slots that repeat multiple times in a control channel superframe, as illustrate in FIG. 9. An exemplary control channel frame structure 900 includes a hyperframe 910, e.g., an IS-136 Digital Control Channel (DCCH) hyperframe, includes a primary and second superframes 920, each comprising slots O allocated to physical layer overhead and a plurality of slots assigned to various logical control channels including paging subchannels P. As terminals engaged in a group call do not require paging, group call traffic channel designation messages can be transmitted in selected paging channel slots 935 that make up higher-frequency subframes 930 within the superframes 920.

A group call enabled terminal monitors one or more paging channel slots assigned to the transmission of group call traffic channel designation messages for the presence of a new group call traffic channel designation message. Because the slots assigned to group call traffic channel designation messages occur more frequently than slots assigned to a single normal paging subchannel, traffic channel designation messages can be more quickly presented to a group than normal pages. Consequently, a terminal monitoring these slots can avoid delay associated with communicating normal traffic channel designation messages to a terminal in sleep mode. Supervisory terminals, i.e., terminals operative to monitor several different groups, can monitor multiple group calls by monitoring each of the paging subchannel slots that are assigned to the transmission of group call traffic channel designation messages.

Figure 10:
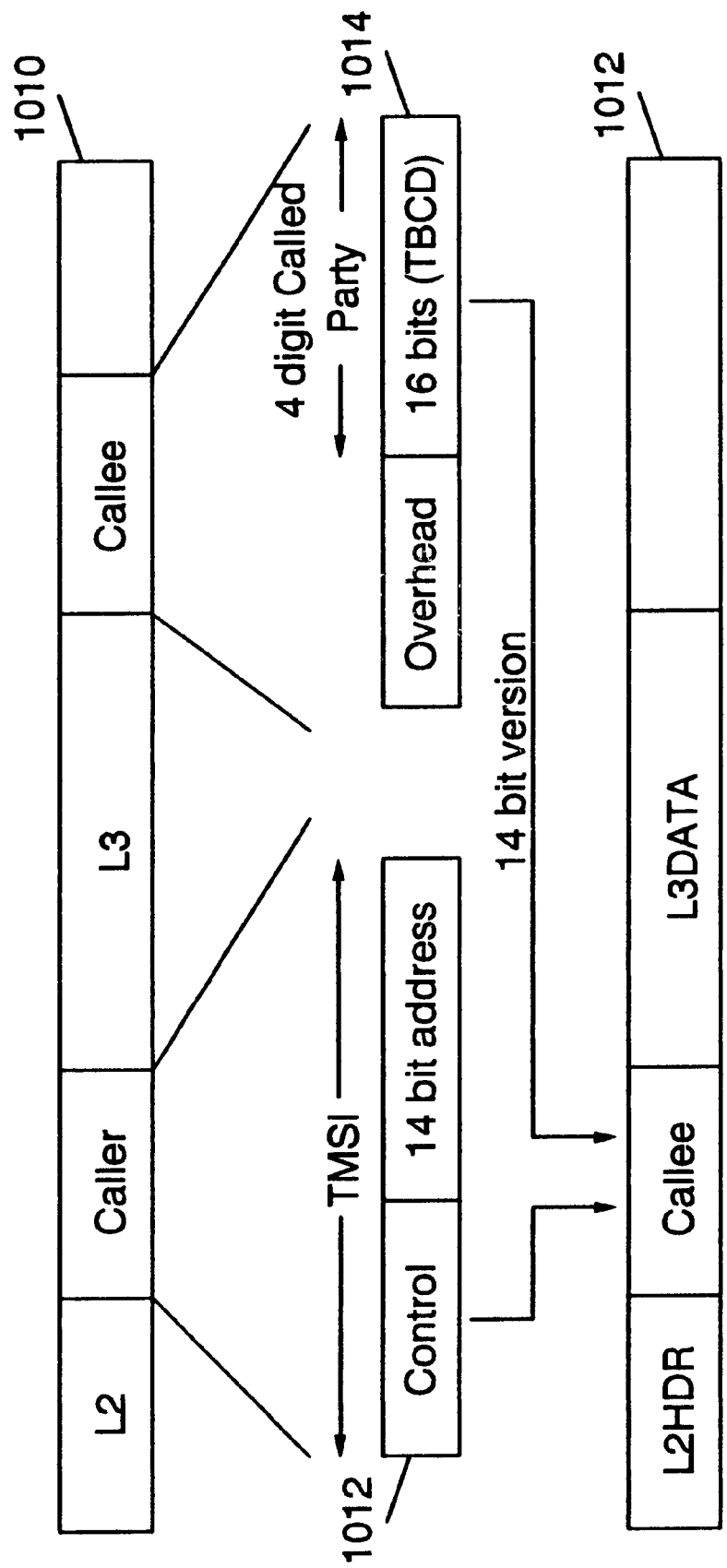
FIG. 10 illustrates an exemplary frame structure according to an aspect of the present invention.

According to yet another aspect of the present invention, additional economy can be achieved by using a compressed format for group call origination messages and/or group call traffic channel designation messages. FIG. 10 illustrates compressed format group call origination and group call traffic channel designation messages 1010, 1020 that are designed for transmission in a single slot. Such single slot messages can reduce access time, increase robustness of the system and reduce loading on the control channel. Robustness may be improved because of a reduced likelihood of corruption in comparison to the two-slot call origination messages typically used in IS-136 systems. In a group call scenario, origination and designation messages preferably are not acknowledged to save time in transmission and contention resolution. Without acknowledgement, however, the system may be unable to determine whether a message was received by a terminal. Using single slot messages can reduce the chance that a single message is missed, and messages can be repeated to further reduce this chance without undue channel loading.

As illustrated in FIG. 10, call origination and traffic channel designation messages 1010, 1020 can be compressed into a single slot by using compressed addresses. IS-136 defines multiple address types, including the 34-bit Mobile Identification Number (MIN) that necessitates that use of 2-slot messages. A preferable choice for group call addressing is the Temporary Mobile System Identification (TMSI), a 20-bit number assigned to a terminal by the system on a temporary basis. In a private system such as DWOS, however, 20 bits is usually more than needed to uniquely address all of the terminals using the system, and therefore, according to the embodiment illustrated in FIG. 10, the least significant 14 bits of the TSMI is used to address call origination and traffic channel designation messages 1010, 1020.

The caller field of the call origination message 1010 preferably includes the 14 least significant bits of the TMSI assigned to the originating (caller) terminal, along with control bits that indicate whether the call is a group call and/or other type of message, such as a broadcast or emergency message. To keep the call origination message 1010 to a single slot, the callee field in the call origination message 1010 is preferably limited to a four digit called party number, which typically is sufficient for a private system such as DWOS (and may also be sufficient for a subsection of a public cellular system in which TMSI addressing is used). The callee field of the origination message 1010 includes a 16-bit field representing the 4 digit called party number in BCD (binary coded decimal) format (4 bits per digit), along with 16 bits of overhead information.

The corresponding traffic channel designation message 1020, is addressed using the 14 bit binary equivalent of the4-digit called party number, along with 6 bits of control information taken from the call origination message 1010. The traffic channel designation message 1020 preferably does not include an identification of the calling party in order to keep the message within a single slot. As described above, the calling party may be identified in a confirm message transmitted over the common traffic channel identified in the group call traffic channel designation message.

It will be appreciated that the above-described addressing scheme allows dispatch features to be used without disrupting the operations of non-dispatch feature enabled terminals (e.g., normal IS-136 terminal that do not support the DWOS group call feature). As TMSIs are assigned by the system and are preferably constrained to 14-bit values, terminals that do not implement group call or other dispatch features will be assigned TMSIs that have zeroes in the bits corresponding to the control information. Accordingly, these terminals will, for example, ignore traffic channel designation messages that have the group call control bit set, as they will interpret these message as messages addressed to terminals with higher TMSI values.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In a wireless communications system including a plurality of distributed transceiver units, each of which are operative to communicate with terminals over a plurality of communications channels, a method of conducting a group call comprising the steps of:

transmitting a group call origination message from an originating terminal;

receiving the group call origination message at a transceiver unit;

transmitting a group call traffic channel designation message addressed to a group of terminals from the transceiver units responsive to the received group call origination message, the transmitted group call traffic channel designation message designating a common traffic channel; and communicating among terminals of the group of terminals via the plurality of distributed transceiver units over the designated common traffic channel, wherein said step of communicating comprises the steps of:

communicating between one of the terminals and first transceiver unit during a group call; and then communicating between the one terminal and a second transceiver unit during the group call, without a handoff.

2. A method according to claim 1, wherein the plurality of transceiver units comprises a plurality of radio heads of a private wireless communications system.

3. A method according to claim 1, wherein said step of communicating comprises the step of conducting half-duplex communications among the terminals over the common traffic channel.

4. A method according to claim 1, wherein the common traffic channel comprises a series of slots on a carrier frequency band.

5. A method according to claim 1, wherein said step of communicating comprises the step of communicating among terminals of the group of terminals without requiring paging a terminal in the group of terminals.

6. A method according to claim 1, wherein said step of transmitting a group call origination message comprises the step of transmitting the group call origination message responsive to a user input at the originating terminal.

7. A method according to claim 1, wherein said step of transmitting a group call traffic channel designation message comprises the step of transmitting a group call traffic channel designation message over a control channel.

8. A method according to claim 7, wherein said step of communicating comprises the steps of:

transmitting data from one of the group of terminals;

receiving the transmitted data at a transceiver unit; and transmitting the received data from the plurality of transceiver units over the common traffic channel.

9. A method according to claim 8, wherein said step of transmitting the received data from the plurality of transceiver units is followed by the steps of:

transmitting a release message from the plurality of transceiver units over the common traffic channel; and then monitoring the control channel for a new group call traffic channel designation message at the terminals in response to receipt of the transmitted release message at the terminals.

10. A method according to claim 9, wherein said step of monitoring the control channel is followed by the step of transitioning to a sleep mode if a predetermined time interval elapses without receipt of a new group call traffic channel designation message.

11. A method according to claim 10, wherein said step of transmitting a release message comprises the step of transmitting a release message indicating the predetermined time interval.

12. A method according to claim 9, wherein said step of transmitting a release message is followed by the steps of:

transmitting a group call origination message from one terminal of the group of terminals;

receiving the group call origination message at a transceiver unit;

transmitting a group call traffic channel designation message addressed to the group of terminals, the group call traffic channel designation message identifying a second common traffic channel; and resuming communications among terminals of the group over the second common traffic channel.

13. A method according to claim 12, wherein the first and second channels are the same channel.

14. A method according to claim 9, wherein said step of transmitting the received data is preceded by the transmitting a group call confirm message identifying the originating terminal from the plurality of transceiver units over the common traffic channel.

15. A method according to claim 14, wherein said step of transmitting data from one of the group of terminals comprises the step of transmitting data from the terminal identified in the group call confirm message.

16. A method according to claim 7, wherein the control channel comprises a series of slots on a carrier frequency band, and wherein said step of transmitting a group call traffic channel designation message comprises the step of transmitting the group call traffic channel designation message in a single slot assigned to the control channel.

17. A method according to claim 1, wherein slots assigned to control channels make up a hyperframe comprising a plurality of superframes, and wherein said step of communicating is preceded by the step of monitoring a set of periodically occurring slots in a plurality of subframes within a superframe for traffic channel designation messages.

18. A method according to claim 17, wherein said step of monitoring comprises the step of monitoring a group call paging subchannel of the control channel.

19. In a wireless communications system including a plurality of distributed transceiver units, each of which are operative to communicate with terminals over a plurality of communications channels, a method of conducting a group call comprising the steps of:

transmitting a group call origination message from an originating terminal;

receiving the group call origination message at a transceiver unit;

transmitting a group call traffic channel designation message addressed to a group of terminals from the transceiver units over a single slot of a control channel responsive to the received group call origination message, the transmitted group call traffic channel designation message designating a common traffic channel; and communicating among terminals of the group of terminals via the plurality of distributed transceiver units over the designated common traffic channel, wherein the group call origination message and the group call traffic channel designation message are addressed based on Temporary Mobile System Identification (TMSI) values assigned by the wireless communications system.

20. A method according to claim 19:
wherein said step of transmitting a group call origination message is preceded by communicating TMSI fields to terminals served by the wireless communications system to thereby assign TMSI values to the terminals, such that the assigned TMSI values represented by the communicated TMSI fields are constrained to be less than or equal to a maximum value represented by a least significant portion of a TMSI field;
wherein the group call origination message includes:
a caller field including the least significant portion of TMSI field communicated to the originating terminal combined with a control bit indicating whether the call origination message is requesting a group call;
a callee field representing a TMSI value assigned to a terminal of the group of terminals; and
wherein said group call traffic channel designation message includes a callee field including the TMSI value assigned to the terminal of the group of terminals combined with the control bit from the group call origination message.

21. A method of operating a wireless terminal in wireless communications system including a plurality of distributed transceiver units, each of which are operative to communicate with terminals over a plurality of communications channels, the method comprising the steps of:
receiving a group call traffic channel designation message addressed to the terminal, the group call traffic channel designation message designating a common traffic channel; and
communicating with a plurality of other terminals via the plurality of distributed transceiver units over the designated common traffic channel, wherein said step of communicating comprises the steps of:
communicating between the terminal and a first transceiver unit during a group call; and then
communicating between the terminal and a second transceiver unit during the group call, without a handoff.

22. A method according to claim 21, wherein said step of communicating comprises the step of conducting half-duplex communications among the terminals over the common traffic channel.

23. A method according to claim 21, wherein the common traffic channel comprises a series of slots on a carrier frequency band.

24. A method according to claim 21, wherein said step of communicating comprises the step of communicating between the terminal and the plurality of other terminals in a group call originated by one of the other terminals without receiving a page at the terminal.

25. A method according to claim 21, wherein said step of receiving is preceded by the step of transmitting a group call origination message from the terminal.

26. A method according to claim 25, wherein said step of transmitting a group call origination message comprises the step of transmitting the group call origination message responsive to a user input at the terminal.

27. A method according to claim 26, wherein said step of transmitting a group call origination message comprises the step of transmitting the group call origination message responsive to user actuation of a push-to-talk (PTT) device.

28. A method according to claim 21, wherein said step of receiving a group call traffic channel designation message comprises the step of receiving a group call traffic channel designation message over a control channel.

29. A method according to claim 28, wherein said step of communicating comprises the steps of:
receiving data over the common traffic channel; and then
receiving a release message over the common traffic channel; and then
monitoring the control channel for a new group call traffic channel designation message.

30. A method according to claim 29, wherein said step of monitoring the control channel comprises the steps of:
monitoring the control channel at a first rate for no greater than a predetermined interval following receipt of a release message over the common traffic channel; and then
monitoring the control channel at a second rate less than the first rate if the predetermined interval lapses without receipt of a new group call traffic channel designation message.

31. A method according to claim 30, wherein said means for receiving a release message comprises means for receiving a release message indicating the predetermined time interval.

32. A method according to claim 30, wherein the control channel comprises a series of slots on a carrier frequency band, and wherein said step of receiving a group call traffic channel designation message comprises the step of receiving the group call traffic channel designation message in a single slot assigned to the control channel.

33. A method according to claim 28, wherein slots assigned to the control channel make up a hyperframe comprising a plurality of superframes, and wherein said step of receiving is preceded by the step of monitoring slots of the control channel that make up a plurality of subframes within each superframe.

34. A method according to claim 33, wherein said step of monitoring comprises the step of monitoring a group call paging subchannel of the control channel.

35. A method according to claim 21, wherein said step of communicating comprises the step of receiving a group call confirm message identifying an originating terminal over the designated common traffic channel.

36. A method according to claim 35, wherein said step of communicating further comprises the step of transmitting data over the common traffic channel if the received group call confirm message identifies the terminal.

37. A method of operating a wireless terminal in wireless communications system including a plurality of distributed transceiver units, each of which are operative to communicate with terminals over a plurality of communications channels, the method comprising the steps of:
receiving a group call traffic channel designation message addressed to the terminal over a single slot assigned to a control channel, the group call traffic channel designation message designating a common traffic channel; and
communicating with a plurality of other terminals via the plurality of distributed transceiver units over the designated common traffic channel,
wherein the group call traffic channel designation message is addressed based on a Temporary Mobile System Identification (TMSI) assigned to a terminal by the wireless communications system.

38. A method according to claim 37, wherein the system communicates TMSI fields to terminals served by the wireless communications system to thereby assign TMSI values to the terminals, such that the assigned TMSI values represented by the communicated TMSI fields are constrained to be less than or equal to a maximum value represented by a least significant portion of a TMSI field, and wherein the group call origination message includes:

a caller field including the least significant portion of TMSI field communicated to the originating terminal combined with a control bit indicating whether the call origination message is requesting a group call;

a callee field representing a TMSI value assigned to a terminal of the group of terminals; and wherein said group call traffic channel designation message includes a callee field including the TMSI value assigned to the terminal of the group of terminals combined with the control bit from the group call origination message.

39. A wireless communications system, comprising:

means for receiving a group call origination message from an originating terminal;

means, responsive to said means for receiving a group call origination message, for transmitting a group call traffic channel designation message addressed to a group of terminals in response to receipt of the group call origination message, the transmitted group call traffic channel designation message designating a common traffic channel; and means, responsive to the common traffic channel, for communicating among terminals of the group of terminals via a plurality of transceiver units over the designated common traffic channel, wherein said means for communicating comprises means for communicating between one of the terminals and a first transceiver unit during a group call and then communicating between the one terminal and a second transceiver unit, without an intervening handoff.

40. A system according to claim 39, wherein said means for receiving a group call origination message, said means for transmitting a group call traffic channel designation message and said means for communicating among terminals comprise a plurality of distributed transceiver units.

41. A system according to claim 40, wherein said plurality of transceiver units comprises a plurality of radio heads.

42. A system according to claim 40, wherein said means for receiving a group call origination message, said means for transmitting a group call traffic channel designation message and said means for communicating among terminals further comprises:

a cellular radio exchange connected to each of said plurality of distributed transceiver units; and a mobility server connected to said cellular radio exchange.

43. A system according to claim 39, wherein said means for communicating comprises means for conducting half-duplex communications among the terminals over the designated common traffic channel.

44. A system according to claim 39, wherein the common traffic channel comprises a series of slots on a carrier frequency band.

45. A system according to claim 39, wherein said means for communicating among terminals comprises means for communicating among terminals of the group responsive to receipt of the group call origination message without a preceding paging of a terminal in the group of terminals.

46. A system according to claim 39, wherein said means for transmitting a group call traffic channel designation message comprises means for transmitting a group call traffic channel designation message over a control channel.

47. A system according to claim 46, wherein said means for communicating comprises:

means for receiving data transmitted from one of the group of terminals over the designated common traffic channel at a transceiver unit of a plurality of distributed transceiver units; and means, responsive to said means for receiving data, for transmitting the received data from the plurality of transceiver units over the common traffic channel.

48. A system according to claim 47, further comprising means for transmitting a group call confirm message identifying the originating terminal over the designated common traffic channel before the data transmitted from the originating terminal is transmitted over the common traffic channel.

49. A system according to claim 47:

wherein said means for receiving data from the one terminal comprises means for receiving a release message transmitted from the one terminal of the group of terminals over the common traffic channel; and wherein said means for transmitting the received data comprises means, responsive to said means for receiving a release message, for transmitting a release message from the plurality of transceiver units over the common traffic channel.

50. A system according to claim 49, wherein said means for transmitting a release message comprises means for transmitting a release message indicating a predetermined time interval for which terminals of the group should monitor the control channel for a new group call traffic channel designation message.

51. A system according to claim 46, wherein slots assigned to the control channel make up a hyperframe comprising a plurality of superframes, and wherein said means for transmitting a group call traffic channel designation message comprises means for transmitting group call traffic designation messages in periodically occurring slots of the control channel that make up a plurality of subframes within a superframe.

52. A system according to claim 51, wherein said means for transmitting a group call traffic channel designation message comprises means for transmitting a group call traffic channel designation message over a group call paging subchannel of the control channel.

53. A system according to claim 39, wherein said means for transmitting a group call traffic channel designation message comprises means for transmitting a group call traffic channel designation message in a single slot assigned to a control channel.

54. A wireless communications system, comprising:

means for receiving a group call origination message from an originating terminal;

means, responsive to said means for receiving a group call origination message, for transmitting a group call traffic channel designation message addressed to a group of terminals in response to receipt of the group call origination message in a single slot assigned to a control channel, the transmitted group call traffic channel designation message designating a common traffic channel; and means, responsive to the common traffic channel, for communicating among terminals of the group of terminals via a plurality of transceiver units over the designated common traffic channel, wherein the group call traffic channel designation message is addressed based on a Temporary Mobile System Identification (TMSI) assigned to a terminal.

55. A system according to claim 54, further comprising means for communicating TMSI fields to terminals such that the assigned TMSI values represented by the communicated TMSI fields are constrained to be less than or equal to a maximum value represented by a least significant portion of a TMSI field;

wherein the group call origination message includes:
a caller field including the least significant portion of TMSI field communicated to the originating terminal combined with a control bit indicating whether the call origination message is requesting a group call;
a callee field representing a TMSI value assigned to a terminal of the group of terminals; and wherein said group call traffic channel designation message includes a callee field including the TMSI value assigned to the terminal of the group of terminals combined with the control bit from the group call origination message.

56. A terminal for use in wireless communications system including a plurality of distributed transceiver units, each of which are operative to communicate with terminals over a plurality of communications channels, the terminal comprising:

means for receiving a group call traffic channel designation message addressed to the terminal, the received group call traffic channel designation message designating a common traffic channel over which the terminal can communicate with other terminals via the distributed plurality of transceiver units; and means, responsive to said means for receiving, for communicating with a plurality of other terminals via the plurality of transceiver units over the designated common traffic channel, including means for communicating between the terminal and a first transceiver unit during a group call and for then communicating between the terminal and a second transceiver unit during the group call, without a handoff.

57. A terminal according to claim 56, wherein the common traffic channel comprises a series of slots on a carrier frequency band.

58. A terminal according to claim 56, wherein said means for communicating comprises means for communicating with a plurality of other terminals over the common traffic channel responsive to the received group call traffic channel designation message without receiving a page.

59. A terminal according to claim 56, further comprising means for transmitting a group call origination message responsive to a user input.

60. A terminal according to claim 59, wherein further comprising a push-to-talk (PTT) device operative to receive the user input.

61. A terminal according to claim 56, wherein said means for receiving a group call traffic channel designation message comprises means for receiving a group call traffic channel designation message over a control channel.

62. A terminal according to claim 61, further comprising:
means for receiving a release message over the common traffic channel; and
means, responsive to said means for receiving a release message, for responsively monitoring the control channel for a new group call traffic channel designation message.

63. A terminal according to claim 61, wherein slots assigned to the control channel make up a hyperframe comprising a plurality of superframes, and further comprising means for monitoring slots of the control channel that make up a plurality of subframes within each superframe.

64. A terminal according to claim 63, wherein said means for monitoring comprises means for monitoring a paging subchannel of the control channel.

65. A terminal according to claim 56, wherein said means for communicating comprises means for receiving a group call confirm message identifying an originating terminal over the designated common traffic channel.

66. A terminal according to claim 65, wherein said means for communicating further comprises means for transmitting data over the common traffic channel if the received group call confirm message identifies the terminal.

67. A terminal for use in wireless communications system including a plurality of distributed transceiver units, each of which are operative to communicate with terminals over a plurality of communications channels, the terminal comprising:

means for receiving a group call traffic channel designation message addressed to the terminal over a control channel, the received group call traffic channel designation message designating a common traffic channel over which the terminal can communicate with other terminals via the distributed plurality of transceiver units;

means, responsive to said means for receiving, for communicating with a plurality of other terminals via the plurality of transceiver units over the designated common traffic channel;

means for receiving a release message over the common traffic channel; and means, responsive to said means for receiving a release message, for responsively monitoring the control channel for a new group call traffic channel designation message, wherein said means for monitoring the control channel comprises means for monitoring the control channel at a first rate for no greater than a predetermined interval following receipt of a release message over the common traffic channel, and for then monitoring the control channel at a second rate less than the first rate if the predetermined interval ends without receipt of a new group call traffic channel designation message.

68. A terminal according to claim 67 wherein said means for receiving a release message comprises means for receiving a release message indicating the predetermined time interval.

69. A terminal according to claim 67, wherein a control channel comprises a series of slots on a carrier frequency band, and wherein said means for receiving a group call traffic channel designation message comprises means for receiving a group call traffic channel designation message in a single slot assigned to the control channel.

70. A terminal according to claim 69, wherein said means for receiving a group call traffic channel designation message comprises means for receiving a traffic channel designation addressed to the terminal based on a Temporary Mobile System Identification (TMSI) assigned to the terminal.

71. A terminal according to claim 70, wherein the wireless communications system communicates TMSI fields to terminals served by the wireless communications system to thereby assign TMSI values to the terminals, such that the assigned TMSI values represented by the communicated TMSI fields are constrained to be less than or equal to a maximum value represented by a least significant portion of a TMSI field, wherein the group call origination message includes a caller field including the least significant portion of TMSI field communicated to the originating terminal combined with a control bit indicating whether the call origination message is requesting a group call and a callee field representing a TMSI value assigned to a terminal of the group of terminals, and wherein said group call traffic channel designation message includes a callee field including the TMSI value assigned to the terminal of the group of terminals combined with the control bit from the group call origination message.

* * * * *